United States Patent [19]

Stark et al.

[11] Patent Number: 5,746,160
[45] Date of Patent: May 5, 1998

[54] HAND-HELD WORKING TOOL WITH COMBUSTION AIR CHANNEL ARRANGED AT BLOWER HOUSING

[75] Inventors: Thomas Stark, Waiblingen; Helmut Zimmermann, Kernen; Klaus-Martin Uhl, Hohengehren, all of Germany

[73] Assignee: Andreas Stihl, Waiblingen, Germany

[21] Appl. No.: 706,181

[22] Filed: Aug. 30, 1996

Related U.S. Application Data

[63] Continuation of Ser. No. 490,128, Jun. 14, 1995, abandoned.

[30] Foreign Application Priority Data

Jun. 14, 1994 [DE] Germany .................. 44 20 530.9

[51] Int. Cl.$^6$ .................................................. F01P 1/02
[52] U.S. Cl. .................... 123/41.7; 123/198 E; 55/437; 55/DIG. 14; 55/DIG. 28
[58] Field of Search .................... 123/198 E, 41.56, 123/41.65, 41.7; 55/437, 438, DIG. 14, DIG. 28

[56] References Cited

U.S. PATENT DOCUMENTS 5,269,265 12/1993 Pretzsch et al. .................... 123/41.7
5,317,997 6/1994 Tomitaku .......................... 123/41.7

FOREIGN PATENT DOCUMENTS 3708289 9/1987 Germany.

*Primary Examiner*—Noah P. Kamen
*Attorney, Agent, or Firm*—Robert W. Becker & Associates

[57] ABSTRACT

A hand-held working tool has a housing and an air cooled internal combustion engine with cooling ribs positioned in the housing. A sealed carburetor box is connected to the internal combustion engine. A blower is positioned in the housing for supplying cooling air to the combustion engine. The blower sucks in cooling air in the axial direction of the blower and conveys it tangentially in the direction of rotation of the blower to the cooling ribs. The housing has a blower cover. A combustion air channel is positioned on a pressure side of the blower and connected to the blower cover and the carburetor box, and the internal combustion engine sucks in combustion air through the carburetor box. The channel has an inlet for branching off combustion air from the cooling air flow that is conveyed to the combustion engine. The inlet is in the form of at least one slot within the blower cover. The inlet has at least one deflecting element with a deflecting front surface for guiding the cooling air and a back side. The guide element is positioned such that the back side covers the inlet in a direction of cooling air flow.

19 Claims, 5 Drawing Sheets

43  48

1

HAND-HELD WORKING TOOL WITH COMBUSTION AIR CHANNEL ARRANGED AT BLOWER HOUSING

This application is a continuation of application Ser. No. 08/490,128 filed Jun. 14, 1995, now abandoned.

BACKGROUND OF THE INVENTION

The present invention relates to a hand-held working tool such as a motor chain saw, a cutter etc. comprising an air-cooled internal combustion engine contained in a housing for driving the tool and also comprising a cooling air blowing device having a blower that axially sucks in cooling air and conveys the cooling air tangentially in the rotational direction of the blower to the cooling ribs of the internal combustion engine. At the pressure side of the blower a combustion air channel is provided that has an inlet opening for branching off from the cooling air the required combustion air. This channel is connected to a sealed carburetor box from which the internal combustion engine sucks in the combustion air.

Such a hand-held working tool is, for example, known from German Offenlegungsschrift 37 08 289. The cooling air is axially sucked in by the blower and is conveyed radially by the blades arranged about the circumference of the blower. The cooling air flows via a cooling air spiral in the direction toward the internal combustion engine. Parallel to the exit diameter of the blower an air deflecting wall is provided which surrounds the inlet opening of a combustion air channel extending in the rotational direction of the blower via which the combustion air is branched off into an air chamber. Since with the cooling air also a considerable amount of dirt particles is sucked in and the channel extends tangentially in the rotational direction of the blower, these dirt particles can enter the combustion air channel and can thus be conveyed into the sealed carburetor box where they must be removed with an air filter. Such an air filter is thus easily clogged by dirt particles and has to be cleaned, respectively, exchanged after a short operation time.

It is therefore an object of the present invention to provide a hand-held working tool of the aforementioned kind with which with simple means a practically dirt particle-free amount of air can be branched off the main cooling air flow and can be guided into the carburetor as combustion air.

SUMMARY OF THE INVENTION

A hand-held working tool according to the present invention is primarily characterized by:

A housing;

An air-cooled internal combustion engine positioned in the housing and having cooling ribs;

A sealed carburetor box connected to the internal combustion engine;

A cooling air blowing device with a blower positioned in the housing for supplying cooling air to the internal combustion engine, the blower sucking in cooling air in the axial direction of the blower and conveying the cooling air flow tangentially in the direction of rotation of the blower to the cooling ribs;

The housing comprising a blower cover;

A combustion air channel positioned on a pressure side of the blower and connected to the blower cover;

The combustion air channel connected to the carburetor box wherein the internal combustion engine sucks in the combustion air through the carburetor box;

The combustion air channel having an inlet for branching off combustion air from the cooling air flow being conveyed to the internal combustion engine, the inlet being in the form of at least one slot within the blower cover; and The inlet having at least one deflecting element with a deflecting front surface for guiding the cooling air flow, and a back side, wherein the deflecting element is positioned such that the back side covers the inlet in a direction of flow of the cooling air flow.

Preferably, the inlet is positioned adjacent to the blower within a range of the diameter of the blower.

Advantageously, the inlet has an arc shape, preferably the shape of a circular arc.

Expediently, the inlet extends over an angle of 15° to 45°; most preferred the angle is 30°.

In a preferred embodiment of the present invention, a portion of the combustion air channel adjacent to the inlet is flat and wide.

Preferably, the inlet comprises a plurality of slots extending substantially transverse to the direction of flow of the cooling air flow. The slots extend preferably parallel to one another. Advantageously, each one of the slots has one of the deflecting elements extending, when viewed in the direction of flow of the cooling air flow, along a forward edge of the slot and having a distance to a rearward edge of the slot of 1.5 mm to 4 mm.

Advantageously, when viewed in the direction of flow of the cooling air flow, the deflecting element has an extension that is greater than a width of the slot.

Preferably, the deflecting elements are louvers and the slots are formed between the louvers.

In yet another embodiment of the present invention the deflecting elements extend at an angle of 100 to 400 relative to the direction of flow of the cooling air flow. Preferably, the angle is 150 to 20°.

Advantageously, the combustion air channel is at least partially comprised of a flexible material. Preferably, the combustion air channel comprises two tube sections and a sleeve made of the flexible material, wherein the sleeve connects the two tube sections. In another embodiment of the present invention, the housing comprises a housing part with a grip. The combustion air channel extends within an outer wall of the blower cover and within an outer wall of the housing part and is comprised of a hose.

The decisive advantages of the present invention are that the blower cover or the crank case receives the inlet so that the inlet can be positioned closely adjacent to the blower and no additional components are required. Furthermore, the cooling air which is laden with dirt particles is deflected with the deflecting element(s) away from the inlet.

In a preferred embodiment of the present invention the inlet is positioned laterally relative to the blower within the diameter of the blower. The cooling air which exits from the blower contains cuttings and dirt particles which due to the centrifugal force are guided along the contour of the cooling air channel. Since the inlet is positioned within the diameter of the blower, no dirt particles or cuttings are present in this area so that at this location the removal of combustion air can be performed without additional cleaning measures. In the case that cuttings are still present within this area, the slot that forms the inlet should be as narrow as possible in order to prevent the passing of cuttings or particles. In order to ensure that the volume of air sucked through the slot is sufficient, it is expedient that the inlet has a corresponding length. The inlet may be arc-shaped and preferably may have the shape of a circular arc. In this context it is expedient that the inlet extends over an angle of 15 to 45°, preferably 30°. For such a design of the inlet, due to the limited constructive depth of the blower cover, the portion of the channel adjacent to the inlet is of a flat and wide shape whereby the side walls converge into a channel section of approximately circular cross-section.

According to a second embodiment of the invention the inlet comprises preferably parallel extending slots whereby these slots extends substantially transverse to the direction of flow of the cooling air. Such an arrangement is to be recommended when due to the spatial requirements the arrangement of a longer slot and a suitable covering is not possible. In an embodiment with a plurality of slots it is expedient that each slot is provided with a deflecting element extending in the flow direction of the cooling air flow along the forward edge of the respective slot and having a distance of approximately 1.5 mm to 4 mm to the rearward edge of the slot. Due to the arrangement of the deflecting elements the main cooling air flow is guided in a suitable manner without deflecting the direction of flow too much. On the other hand, the narrow width of the slot prevents the passage of cuttings etc.

As mentioned above, the solid particles contained within the cooling air flow maintain their direction substantially due to their inertia. Accordingly, the degree of purity of the air also depends on how extreme the directional change for the sucked-in combustion air is. Such an extreme change of direction can be achieved when the extension of the deflecting elements in the direction of cooling air flow is greater than the width of the slots. In this manner, a deflection of approximately 180° is achieved. In order to affect the main flow direction only to a small extent, it is expedient that the deflecting elements have an angle relative to the main flow direction of between 10 and 40°, preferably smaller than 20°. In order to be able to keep this angle as small as possible, it is advantageous that the slots are formed between louvers that serve as deflecting elements for the cooling air flow.

The housing of a hand-held working tool is divided into two parts, especially for motor chain saws, between which a vibration gap is provided. Since the inlet and thus the forward end of the channel is coordinated with one housing part while the carburetor box is positioned at the other housing part, the channel must bridge the vibration gap. In order to prevent transfer of the vibrations onto the channel, it is expedient to embody the channel at least partially of a flexible (elastic) material. In order to protect the channel against damage, it should be comprised of two tube sections that are connected to one another with a sleeve made of an elastic material.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiment utilizing FIGS. 1 through 6.

Figure 1:
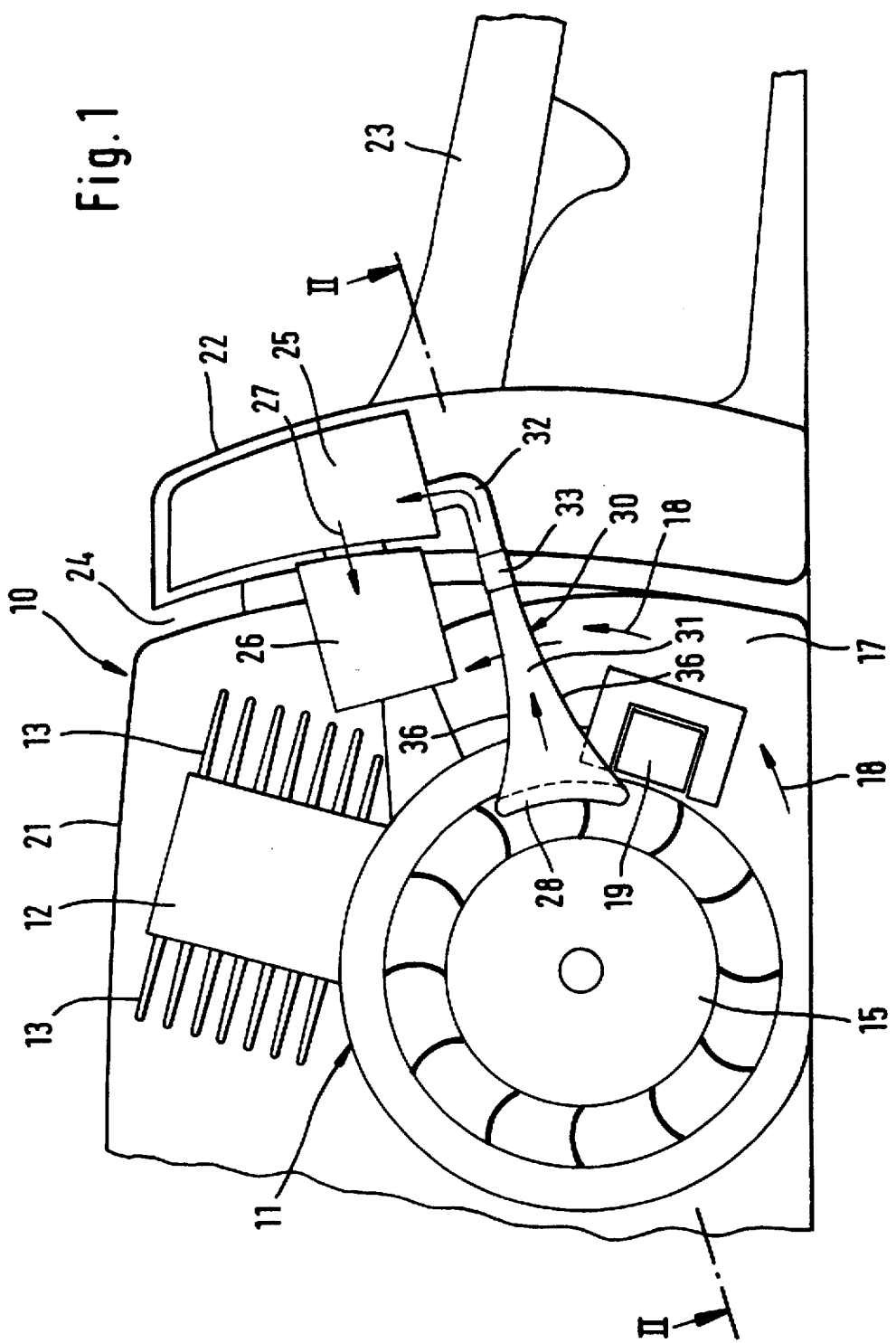
FIG. 1 shows a detail of a working tool in the area of the drive motor and the cooling air guiding system with branching off of combustion air.
Figure 2:
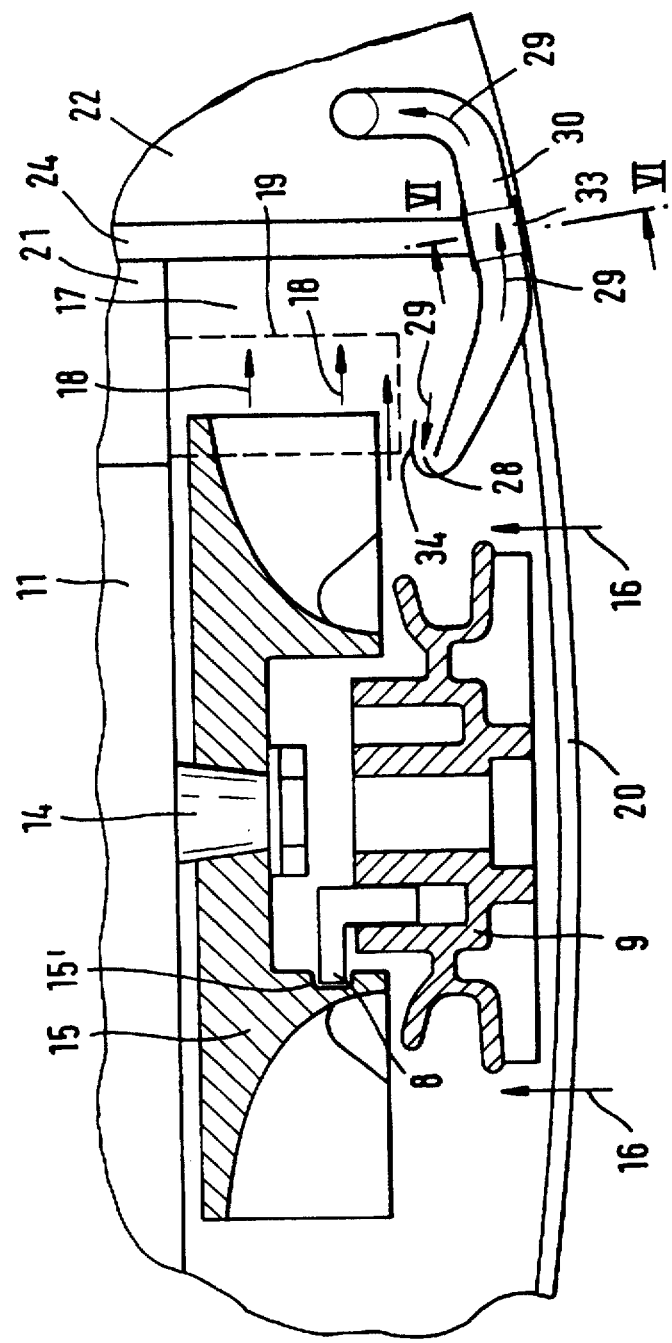
FIG. 2 shows a view along the line II—II in FIG. 1 with a cable drum positioned at the blower.

FIGS. 1 and 2 show an embodiment comprising a housing 10 with internal combustion engine 11 arranged therein. The cylinder 12 of the internal combustion engine 11 is provided with cooling ribs 13. On a shaft 14 extending from the combustion engine 11 a blower 15 is mounted which sucks in air in the axial direction (arrow 16) and which conveys the air radially into a cooling air channel 17 (arrow 18). At a small distance to the blower 15 an ignition module 19 is provided along which the cooling air flow (18) passes. From the cooling air channel 17 the cooling air flow (18) is guided to the cooling ribs 13 of the cylinder 12 whereby a deflection of the cooling air flow transverse to the direction of the housing takes place. Subsequently, the cooling air exits at the side of the housing 10 facing away from the blower 15.

The housing 10 comprises two housing parts 21 and 22 whereby the combustion engine 11 is arranged within the housing part 21 and the housing part 22 has a grip 23 connected thereto. Between the housing parts 21 and 22 a vibration gap 24 is provided which makes possible a limited relative movement between the housing parts 21 and 22. FIG. 2 shows that in front of the blower 15 a cable drum 9 for starting up the internal combustion engine is arranged which engages with corresponding pawls 8 recesses 15' of the blower 15 in the manner of a slip coupling. The forward end of the housing part 21 is formed by a blower cover 20 which is provided with openings for allowing passage of air (arrow 16). Within the housing part 22 a carburetor box 25 is arranged which is connected to the carburetor 26. The combustion air for the combustion engine 11 is sucked from the carburetor box 25 in the direction of arrow 27 into the carburetor 26. The combustion air is branched off in an area laterally positioned to the blower 15 through an inlet 28 from the cooling air flow (18) and is guided (arrows 29) through the channel 30 into the carburetor box 25. The combustion air channel 30 comprises according to the embodiment of FIG. 1 two tubular sections 31 and 32 which are connected by a sleeve 33 made of elastic material. The inlet opening 28 is embodied as a narrow arc-shaped slot. This slot extends concentrically to the circumference of the blower 15 and thus has the shape of a circular arc which in the shown embodiment extends over an angle of approximately 35°.

As can be seen in particular in FIG. 2, between the inlet 28 and the blower 15 a wall section, forming a deflecting element 34, extends which serves for guiding the cooling air flow (18) in the main direction of cooling air flow. In this manner, the combustion air stream is deflected by 180° relative to the flow direction of the main cooling air flow. The channel section 31 in the area adjacent to the inlet 28 has a flat and wide shape whereby the sidewalls 36 converge into a channel section of an approximately circular cross-section received within the blower cover 20 or the housing part 21.

Figure 3:
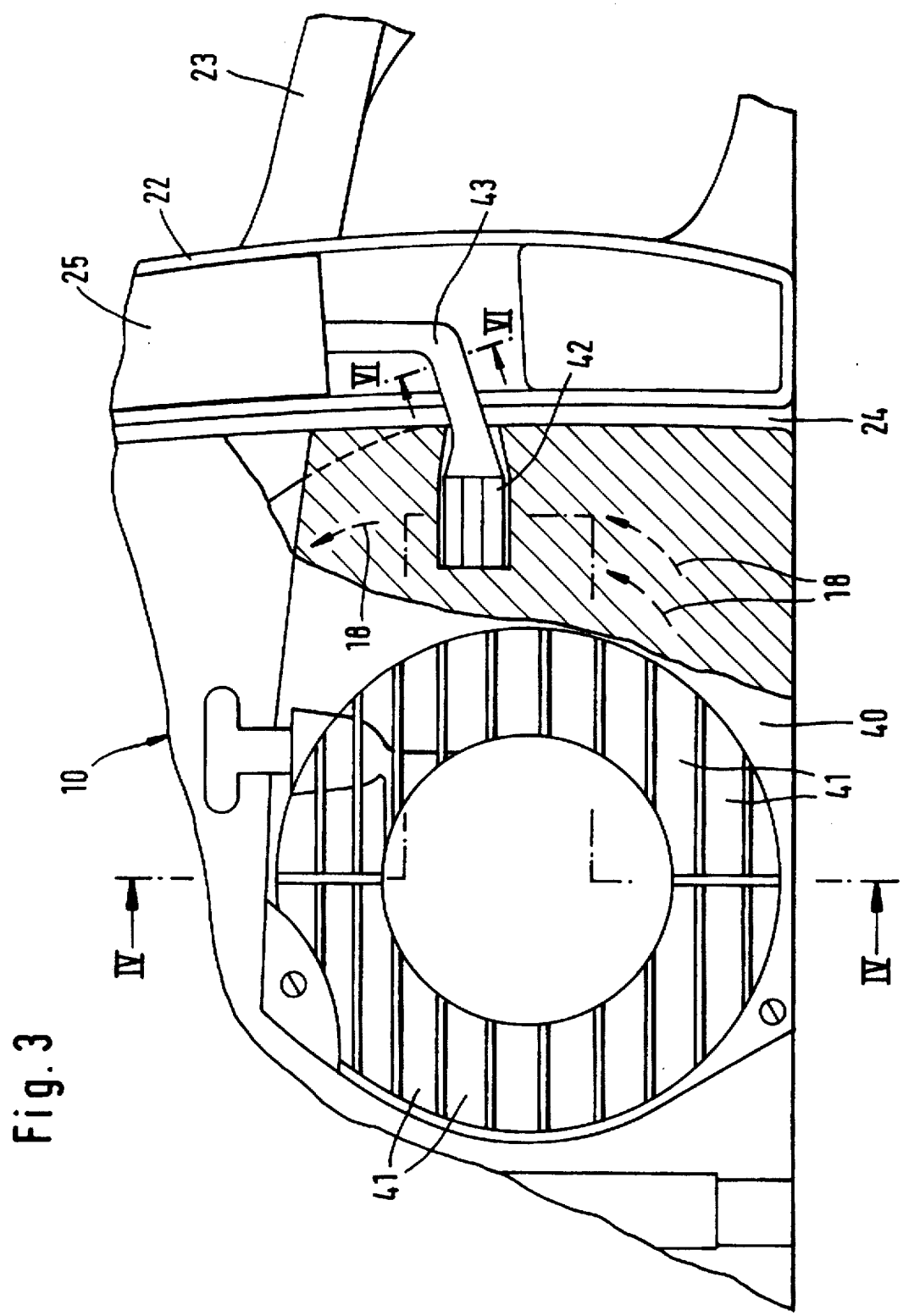
FIG. 3 shows a variant of FIG. 1.
Figure 4:
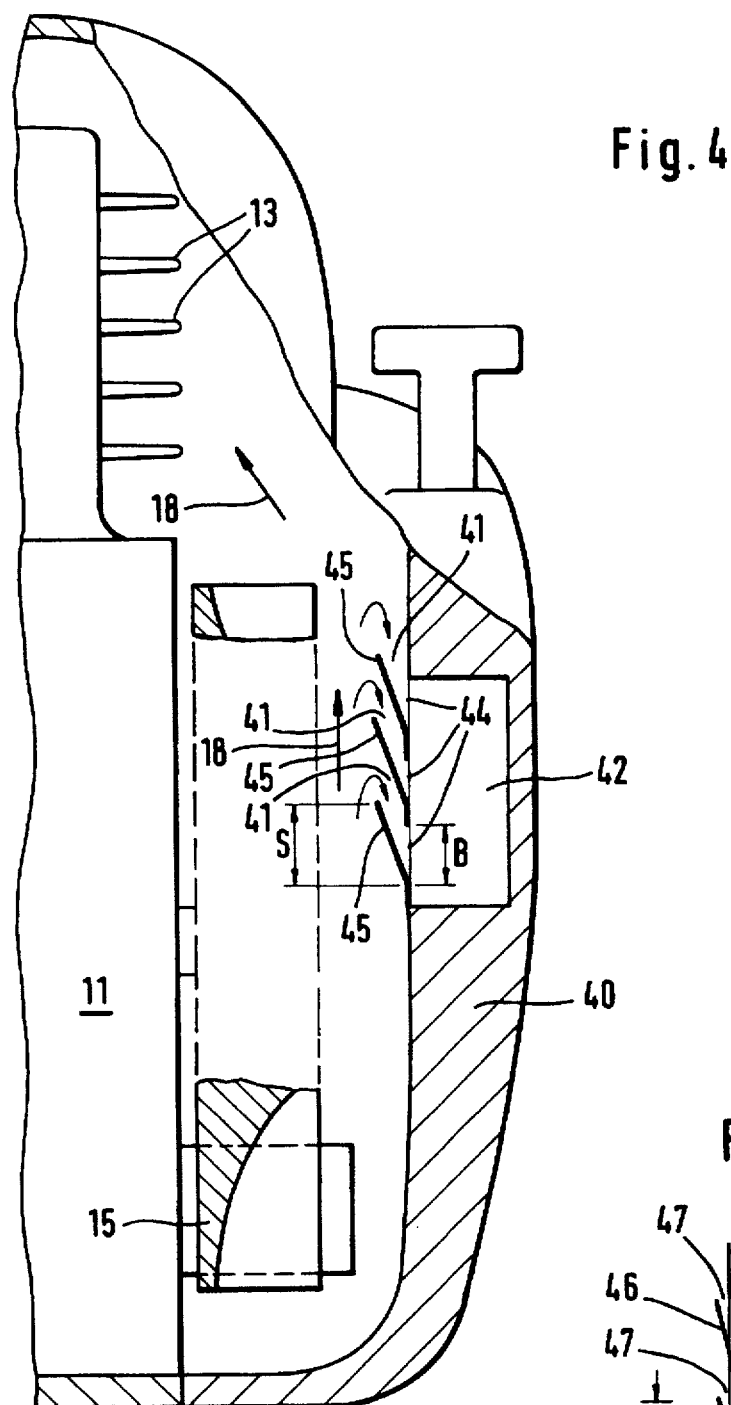
FIG. 4 shows a section along line IV—IV of FIG. 3.

In the embodiment of FIGS. 3 and 4 the housing 10 is represented with a blower cover 40 in which openings 41 for allowing passage of cooling air are provided.

Between the blower cover 40 and the internal combustion engine 11 a blower 15 is positioned which conveys the cooling air to the cooling ribs 13. Within the blower cover 40 a section of the channel 43 is provided the forward end of which forms a chamber 42 comprising three parallel extending slots 44 that are positioned transverse to the main direction of cooling air flow. However, it is also possible to provide more than three slots if this is favorable for the respective application. At the respective forward edge of each slot 44, viewed in the direction of cooling air flow (18), a deflecting element 45 is provided that covers the respective slot 44, whereby the free end is positioned at a certain distance to the respective rearward edge of the slot 44. Due to this spacing, which can be adjusted as desired, the width of the respective passage of the respective slot 44 is determined. In order to affect the cooling air flow (18), respectively, its main flow direction as little as possible, the deflecting elements 45 are arranged at an angle of approximately 20° relative to the main flow direction (18). Since according to the representation of FIG. 4 the deflecting elements 45 have an extension S in the direction of flow of the cooling air which is greater than the width B of the slot 44, the length of the travel path of the deflected combustion air is increased. It is thus ensured that the angle of deflection is approximately 180°.

Figure 5:
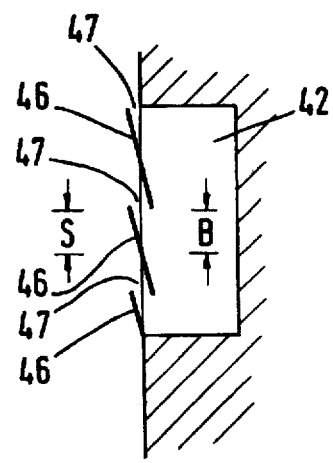
FIG. 5 shows a further embodiment of the inlet for combustion air.

The embodiment of FIG. 5 differs from the embodiment of FIG. 4 in that the deflecting elements are in the shape of louvers 46 between which the slots 47 extend. For such an arrangement the extension S corresponds to the width B whereby, however, the passage for the air is determined by the distance between the edges of one louver 46 to the adjacent edge of the neighboring louver 46. In this manner smaller angles of the deflecting elements, in this embodiment the louvers 46, relative to the main flow direction (18) are necessary.

In the embodiments according to FIGS. 3 to 5 the combustion air channel 30 can extend completely within the blower cover 40 and the housing part 22. Since the channel 30 is thus protected against damage, it is not necessary to use a mechanically highly loadable material, so that the channel can be comprised of a hose made of flexible material (48).

Figure 6:
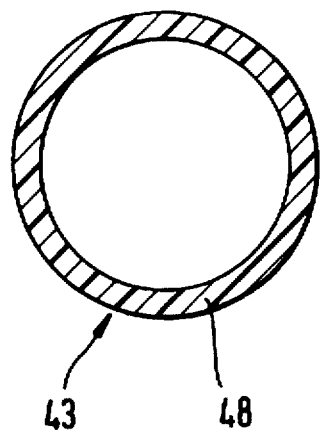
FIG. 6 shows a section through the elastic sleeve, respectively, the elastic hose according to line VI of FIGS. 2 and 3.

FIG. 6 shows a section along line VI—VI of FIG. 2, respectively, FIG. 3 of the sleeve 33 or the hose 43 which forms the channel extending between the chamber 42 to the carburetor box 25.

The present invention is, of course, in no way restricted to the specific disclosure of the specification and drawings, but also encompasses any modifications within the scope of the appended claims.

What we claim is:

1. A hand-held working tool comprising:

a housing;

an air-cooled internal combustion engine positioned in said housing and having cooling ribs;

a sealed carburetor box connected to said internal combustion engine;

a cooling air blowing device with a blower positioned in said housing for supplying cooling air to said internal combustion engine, said blower sucking in cooling air in the axial direction of said blower and conveying a cooling air flow in a flow direction radially relative to said blower and then tangentially in the direction of rotation of said blower to said cooling ribs;

said housing comprising a blower cover;

a combustion air channel connected to said blower cover;

said combustion air channel connected to said carburetor box, wherein said internal combustion engine sucks in the combustion air through said carburetor box;

said combustion air channel having an inlet for branching off a combustion air flow from the cooling air flow, said inlet being in the form of at least one slot within said blower cover;

said inlet positioned adjacent to said blower within a range of the diameter of said blower; and at least one deflecting element connected to said inlet, said deflecting element having a deflecting front surface for guiding the cooling air flow in said flow direction and a back side, wherein said deflecting element is positioned such that said back side covers said inlet in the flow direction of the cooling air flow and said combustion air flow is reversed relative to said flow direction of the cooling air along said back side into said inlet.

2. A hand-held working tool according to claim 1, wherein said inlet has an arc shape.

3. A hand-held working tool according to claim 2, wherein said arc shape is a circular arc.

4. A hand-held working tool according to claim 2, wherein said inlet extends over an angle of 15° to 45°.

5. A hand-held working tool according to claim 4, wherein said angle is 30°.

6. A hand-held working tool according to claim 1, wherein a portion of said combustion air channel adjacent to said inlet is flat and wide.

7. A hand-held working tool according to claim 1, wherein said combustion air channel is at least partially comprised of a flexible material.

8. A hand-held working tool according to claim 7, wherein said combustion air channel comprises two tube sections and a sleeve made of said flexible material, wherein said sleeve connects said two tube sections.

9. A hand-held working tool according to claim 7, wherein:

said housing comprises a housing part with a grip;

said combustion air channel extends within an outer wall of said blower cover and within an outer wall of said housing part; and said combustion air channel is comprised of a hose.

10. A hand-held working tool comprising:

a housing;

an air-cooled internal combustion engine positioned in said housing and having cooling ribs;

a sealed carburetor box connected to said internal combustion engine;

a cooling air blowing device with a blower positioned in said housing for supplying cooling air to said internal combustion engine, said blower sucking in cooling air in the axial direction of said blower and conveying a cooling air flow in a flow direction radially relative to said blower and then tangentially in the direction of rotation of said blower to said cooling ribs;

said housing comprising a blower cover;

a combustion air channel connected to said blower cover;

said combustion air channel connected to said carburetor box, wherein said internal combustion engine sucks in the combustion air through said carburetor box;

said combustion air channel having an inlet for branching off a combustion air flow from the cooling air flow, said inlet being in the form of at least one slot within said blower cover; and at least one deflecting element connected to said inlet, said deflecting element having a deflecting front surface for guiding the cooling air flow in said flow direction and a back side, wherein said deflecting element is positioned such that said back side covers said inlet in the flow direction of the cooling air flow and said combustion air flow is reversed relative to said flow direction of the cooling air along said back side into said inlet;

wherein said inlet comprises a plurality of said slots extending substantially transverse to said direction of flow of the cooling air flow;

wherein each one of said slots has one of said deflecting elements extending, when viewed in said direction of flow of the cooling air flow, along a forward edge of said slot at a slant to said direction of flow.

11. A hand-held working tool according to claim 10, wherein said slots extend parallel to one another.

12. A hand-held working tool according to claim 10, wherein said deflecting elements have a distance to a rearward edge of said slot of 1.5 mm to 4 mm.

13. A hand-held working tool according to claim 10, wherein, viewed in said direction of flow of the cooling air flow, said deflecting element has an extension that is greater than a width of said slot.

14. A hand-held working tool according to claim 10, wherein said deflecting elements are louvers and said slots are formed between said louvers.

15. A hand-held working tool according to claim 10, wherein said deflecting elements extend at an angle of 10° to 40° relative to said direction of flow of the cooling air flow.

16. A hand-held working tool according to claim 15, wherein said angle is 15° to 20°.

17. A hand-held working tool according to claim 10, wherein said combustion air channel is at least partially comprised of a flexible material.

18. A hand-held working tool according to claim 17, wherein said combustion air channel comprises two tube sections and a sleeve made of said flexible material, wherein said sleeve connects said two tube sections.

19. A hand-held working tool according to claim 17, wherein:

said housing comprises a housing part with a grip;

said combustion air channel extends within an outer wall of said blower cover and within an outer wall of said housing part; and said combustion air channel is comprised of a hose.

* * * * *